(12) United States Patent
Nakahama et al.

(10) Patent No.: US 8,163,816 B2
(45) Date of Patent: Apr. 24, 2012

(54) PRODUCTION PROCESS OF LIQUID COMPOSITION, IMAGE FORMING PROCESS AND IMAGE FORMING APPARATUS

(75) Inventors: Kazumichi Nakahama, Tokyo (JP); Takayuki Teshima, Yokohama (JP); Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 11/746,233

(22) Filed: May 9, 2007

(65) Prior Publication Data

US 2007/0283847 A1    Dec. 13, 2007

(30) Foreign Application Priority Data

Jun. 9, 2006 (JP) ................. 2006-161522

(51) Int. Cl.
- C09D 11/00 (2006.01)
- C08F 8/30 (2006.01)
- B60C 1/00 (2006.01)
- C08L 53/00 (2006.01)
- B41J 2/01 (2006.01)

(52) U.S. Cl. ........ 523/160; 524/555; 524/570; 524/505; 347/1

(58) Field of Classification Search .................. 523/160, 523/161; 106/31.85; 347/1; 524/505, 555, 524/570

See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,085,698 A | 2/1992 | Ma et al. | 106/20 |
| 5,928,419 A | 7/1999 | Uemura et al. | 106/493 |
| 7,192,477 B2 | 3/2007 | Nakanishi et al. | 106/412 |
| 2002/0112644 A1* | 8/2002 | Nakamura et al. | 106/401 |
| 2002/0186288 A1* | 12/2002 | Nakazawa et al. | 347/100 |
| 2005/0249925 A1* | 11/2005 | Ikegami et al. | 428/195.1 |
| 2006/0057485 A1 | 3/2006 | Teshima et al. | |
| 2006/0060109 A1* | 3/2006 | Yamada et al. | 106/31.65 |
| 2007/0119336 A1 | 5/2007 | Nakahama et al. | |
| 2007/0149651 A1 | 6/2007 | Teshima et al. | |
| 2007/0172589 A1 | 7/2007 | Teshima et al. | |
| 2007/0215270 A1 | 9/2007 | Nakahama et al. | |
| 2007/0283847 A1 | 12/2007 | Nakahama et al. | |

FOREIGN PATENT DOCUMENTS

| | | |
|---|---|---|
| JP | 59-123670 A | 7/1984 |
| JP | 59-138461 A | 8/1984 |
| JP | 64-63185 A | 3/1989 |
| JP | 6-096679 A | 4/1994 |
| JP | 10-110111 A | 4/1998 |
| JP | 2004-091560 A | 3/2004 |

OTHER PUBLICATIONS

Fred W. Billmeyer, Jr, "Textbook of Polymer Science, 3rd Edition" John Wiley & Sons, Inc., New York pp. 16-18 (1984).*
L. H. Sperling, "Introduction to Physical Polymer Science", John Wiley & Sons, Inc, New York, New York, pp. 6-7 and 97-99 (1992).*

* cited by examiner

*Primary Examiner* — Basia Ridley
*Assistant Examiner* — Alexander Kollias
(74) *Attorney, Agent, or Firm* — Fitzpatrick, Cella, Harper & Scinto

(57) ABSTRACT

A process for producing a liquid composition including a pigment and a stimuli-responsive dispersant, the pigment being contained in the liquid composition in a dispersed state, the process including (1) obtaining a solution dissolving the pigment in a first solvent and (2) mixing the solution with a second solvent, wherein the stimuli-responsive dispersant is contained in at least one solvent of the first and second solvents. The first solvent is an aprotic solvent. The second solvent is water or an aqueous solution.

12 Claims, 1 Drawing Sheet

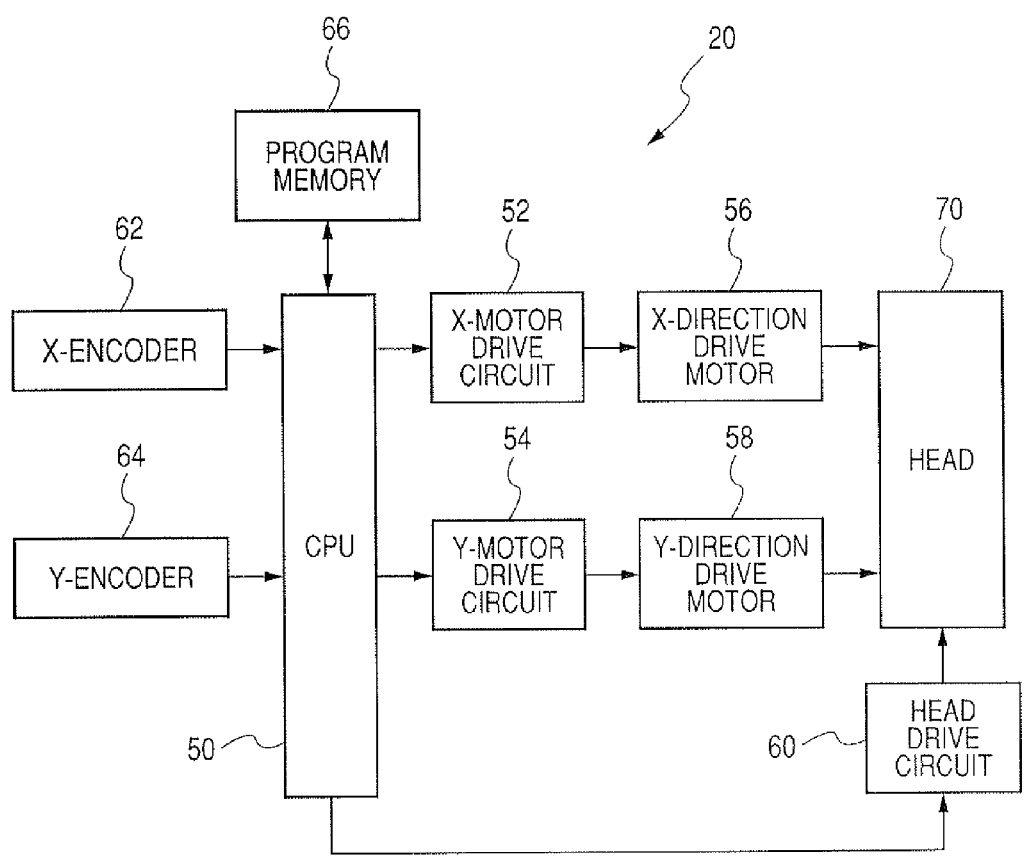

PRODUCTION PROCESS OF LIQUID COMPOSITION, IMAGE FORMING PROCESS AND IMAGE FORMING APPARATUS

BACKGROUND OF THE INVENTION

1. Field of the Invention

The present invention relates to a production process of a liquid composition useful as an ink-jet ink, and an image forming process and an image forming apparatus using the liquid composition.

2. Description of the Related Art

In recent years, digital printing technology is making very dramatic progress. Typical examples of this digital printing technology include what is called electrophotographic technique or ink-jet technique, and its significance has been more and more increased as image forming technique in offices, homes and so forth.

In particular, the ink jet technique has such a great characteristic feature as compactness and low power consumption, as a direct recording method. Also, image quality is being rapidly improved as nozzles are made finer. An example of the ink jet technique is a method in which an ink fed from an ink tank is heated with heaters in nozzles to cause evaporation to bubbling, whereupon the ink is ejected to form images on a recording medium. Another example is a method in which the ink is ejected from nozzles by vibrating piezoelectric elements.

Water-soluble dye inks have been applied to these methods to date. However, the dye inks have involved problems of blurring or bleeding, feathering and weatherability.

In order to solve these problems, it has been investigated in recent years to use pigment inks (see U.S. Pat. No. 5,085,698). In fact, ink-jet inks containing a pigment dispersion in their ink compositions also begin to spread.

However, the pigment inks are often poor in long-term storage stability and ejection stability from an ink jet head compared with dye inks. In addition, images formed with the pigment inks generally tend to be low in color developability compared with images formed with the dye inks because they cause light scattering and/or light reflection by the influence of pigment particles.

As a method for improving the color developability of the pigment inks, it has been attempted to pulverize pigment particles. A pigment (hereinafter referred to as "fine pigment particles" pulverized to 10 nm or less suffers little influence of light scattering and increases its specific surface area and is thus expected to achieve the color developability comparable with that of a dye.

The pulverization of the pigment particles is generally mechanically conducted by means of a dispersing machine such as a sand mill, roll mill or ball mill. In these methods, the pulverization of the pigment is limited to the vicinity of primary particles (about 100 nm), and so it takes a lot of time and cost to require further pulverization. In addition, it is difficult to stably provide those having uniform quality (Japanese Patent Application Laid-Open No. H10-110111).

On the other hand, Japanese Patent Publication No. H06-096679 and Japanese Patent Application Laid-Open No. 2004-091560 have proposed a method for preparing fine pigment particles by dissolving a pigment in a solvent and then mixing the resultant solution with a poor solvent for the pigment to reprecipitate the pigment (hereinafter referred to as "reprecipitation method").

The reprecipitation method is an effective method for pulverizing a pigment, but involves a problem that the concentration of the pigment to be prepared is extremely dilute because the solubility of the pigment in the solvent is poor.

In order to apply such fine pigment particles to, for example, a liquid composition for ink, it is essential to concentrate the fine pigment particles. However, a method making use of an evaporator or ultrafilter, which is known as a general concentrating method, takes a lot of time and cost to concentrate the dilute fine pigment particles to a high concentration.

SUMMARY OF THE INVENTION

A process for producing a liquid composition, which is provided by the present invention, is a process for producing a comprising a pigment and a stimuli-responsive dispersant, the pigment being contained in the liquid composition in a dispersed state, the process comprising (1) obtaining a solution dissolving the pigment in a first solvent and (2) mixing the solution with a second solvent, wherein the stimuli-responsive dispersant is contained in at least one solvent of the first and second solvents.

A process for concentrating a liquid composition, which is provided by the present invention, is a process for concentrating a liquid composition comprising a pigment and a stimuli-responsive dispersant composed of a polymer compound having a site having a lower critical solution temperature in water or an aqueous solution, the pigment being contained in the liquid composition in a dispersed state, the process comprising (1) preparing the liquid composition containing the pigment in a dispersed state according to the production process of the liquid composition according to the present invention, (2) heating the liquid composition to a temperature not lower than the lower critical solution temperature to form an aggregate comprised of pigment particles followed by removing a part or all of other components than the pigment particles from the liquid composition, and (3) cooling the liquid composition to a temperature not higher than the lower critical solution temperature to set the pigment particles making up the aggregate comprised of the pigment particles into a dispersed state.

The present invention embraces a liquid composition containing a pigment in a dispersed state, which is produced by the process according to the present invention.

The present invention also embraces an ink jet recording ink composition comprising the liquid composition produced by the process according to the present invention.

The present invention further embraces an image forming process comprising applying the ink composition according to the present invention to a medium, thereby recording an image.

The present invention still further embraces an image forming apparatus comprising a unit for applying the ink composition according to the present invention to a medium, thereby recording an image.

Further features of the present invention will become apparent from the following description of exemplary embodiments with reference to the attached drawing.

BRIEF DESCRIPTION OF THE DRAWING

FiGURE is a block diagram illustrating the construction of an ink jet recording apparatus.

DESCRIPTION OF THE EMBODIMENTS

The present invention provides a production process of a liquid composition including fine pigment particles of the order of nanometer in a dispersed state and a process for simply and efficiently concentrating the liquid composition to a desired concentration.

The present inventors have carried out an extensive investigation as to a mechanism of forming fine pigment particles by the reprecipitation method and various factors affecting dispersion/aggregation behavior in an aqueous solution of the fine pigment particles.

As a result, it has been found that fine pigment particles produced by using a stimuli-responsive dispersant having a lower critical solution temperature have excellent dispersibility and can be highly concentrated through a simple concentrating step because they can be aggregated/redispersed by a temperature change of several degrees C. from below to above the lower critical solution temperature and vice versa.

The present invention can provide a liquid composition including fine pigment particles, which have high size uniformity and are of the order of nanometer, in a dispersed state.

The present invention can further provide a process for concentrating a liquid composition including fine pigment particles to a desired concentration in a short period of time and at low cost, by which the period of the concentrating step that has posed a problem to date can be greatly shortened.

The present invention will hereinafter be described in detail.

The process for producing a liquid composition, which is provided by the present invention, is a process for producing a liquid composition including a pigment and a stimuli-responsive dispersant, the pigment being contained in the liquid composition in a dispersed state, the process including (1) obtaining a solution dissolving the pigment in a first solvent and (2) mixing the solution with a second solvent, wherein the stimuli-responsive dispersant is contained in at least one solvent of the first and second solvents.

According to the present invention, fine pigment particles, which have high size uniformity and are of the order of nanometer, can be obtained in a dispersed state. Incidentally, the high size uniformity means that the particle size distribution of the fine pigment particles is narrow. The order of nanometer means that the particle size of the fine pigment particles is 100 nm or less.

In the present invention, the mechanism with which the fine pigment particles are obtained in the dispersed state is as follows.

When the first solvent is mixed with the second solvent, the pigment in the state dissolved in the first solvent is rapidly insolubilized to form particle nuclei. In the process of aggregating the nuclei, the dispersant is adsorbed on the surface of the pigment, whereby the fine pigment particles can be obtained in the dispersed state.

The fine pigment particles obtained in such a manner are coated on the surfaces thereof with the dispersant, and the properties of the dispersant are factors predominating the surface properties of the fine pigment particles.

Since a pigment is low in solubility in solvents, however, the concentration of fine particles of the pigment contained in a liquid composition is extremely low when the fine pigment particles are formed by means of such a process.

It is possible to concentrate the fine pigment particles contained in the liquid composition by applying a general concentrating method such as evaporation, ultrafiltration or centrifugal separation. However, it takes a lot of time and cost to concentrate a dilute liquid composition to a high concentration, which poses a great problem.

In addition, it is indicated as a problem to be solved that the fine pigment particles tend to lower the dispersibility upon the concentration.

The present invention has succeeded in achieving the following two objects at the same time by forming pigment particles by using a stimulus-responsive dispersant. Namely, the two objects are (1) obtaining fine pigment particles which have high size uniformity and are of the order of nanometer in a dispersed state, and (2) concentrating a liquid composition including the fine pigment particles simply to a desired concentration in a short period of time.

(Stimuli-Responsive Dispersant)

The stimuli-responsive dispersant used in the present invention is a polymer compound having a site (hereinafter referred to as "stimuli-responsive site") that reversibly changes hydrophilicity and hydrophobicity with respect to an external stimulus.

In the present specification, the hydrophilicity is such a nature as to have high affinity for water and to be easily dissolved in water, while the hydrophobicity is such a nature as to have low affinity for water and to be hardly dissolved in water. The fine pigment particles, which have the polymer compound having the stimuli-responsive site on their surfaces, reversibly change their surface properties with respect to the external stimulus. For example, when such fine pigment particles are dispersed in water or an aqueous solution, the surfaces of the particles are hydrophilized and the particles exhibit good dispersibility when an external stimulus, by which the stimuli-responsive site is changed to the hydrophilicity, is applied thereto. On the other hand, the surfaces of the particles are hydrophobilized and aggregation and precipitation occur when an external stimulus, by which the stimuli-responsive site is changed to the hydrophobicity, is applied thereto. Further, when an external stimulus, by which the stimuli-responsive site is changed to the hydrophilicity, is applied to the fine pigment particles in an aggregated and precipitated state, the fine pigment particles can be redispersed in a dispersed state.

As external stimuli used in the present invention, may be mentioned temperature changes, pH changes and application of electromagnetic waves (for example, photo-stimuli). However, any stimulus may be applied within limits that the objects of the present invention can be achieved so far as it is an external stimulus by which the stimuli-responsive site of the polymer compound can be reversibly changed from the hydrophilicity to the hydrophobicity, or from the hydrophobicity to the hydrophilicity.

Stimuli due to temperature changes can be particularly desirably used as the external stimuli in the present invention from the viewpoint of easy handling. As the site that reversibly changes hydrophilicity and hydrophobicity by a temperature change, a compound exhibiting a lower critical solution temperature or a polymer thereof may be desirably used.

In the present specification, the lower critical solution temperature means a particular temperature at which the solubility of a certain compound is rapidly lowered at that temperature or higher. Examples of such a compound include poly (N-substituted acrylamides) that are polymers of N-substituted acrylamide derivatives. However, other compounds or polymers may also be applied within such limits that the like effect can be expected.

However, the temperature-responsive site in the present invention is not limited to compounds exhibiting a lower critical solution temperature in aqueous solutions and polymers thereof.

For example, compounds exhibiting a upper critical solution temperature and other compounds may also be applied within such limits that the objects of the present invention can be achieved.

In the present specification, the upper critical solution temperature means a particular temperature at which the solubility of a certain compound is rapidly lowered at that temperature or lower.

As the site that reversibly changes hydrophilicity and hydrophobicity by pH, a compound containing a functional group, whose degree of dissolution is changed depending on pH conditions, typified by, for example, a carboxyl group or an amino group, or a polymer having such a functional group in its main chain or side chain may be used.

Since the dissociation of the carboxyl group is inhibited in a low pH range in a carboxyl group-containing compound, the nature of the compound shifts to hydrophobicity rather than in being dissociated.

Since the dissociation of the amino group is inhibited in a high pH range in an amino group-containing compound, the nature of the compound shifts to hydrophobicity rather than in being dissociated.

However, the pH-responsive site in the present invention is not limited to compounds containing a carboxyl group or amino group or polymers having such a functional group in their main chains or side chains, and any other compound may be applied within such limits that the objects of the present invention can be achieved.

As examples of the site that reversibly changes hydrophilicity and hydrophobicity due to photo-stimuli, may be mentioned azobenzene-containing compounds and polymers thereof.

A photoisomerization reaction of an azobenzene-containing compound has been known in the prior art, and trans-azobenzene having no substituent is generally isomerized to a cis form by exciting the π bond of the azo group by irradiation of ultraviolet rays ($\lambda_{max}$=320 nm).

Since the azobenzene-containing compounds and polymers thereof are greatly different in molecular polarity between the trans forms and cis forms thereof, they may desirably be applied as the stimuli-responsive sites in the present invention. However, the photo-responsive sites in the present invention are not limited to the azobenzene-containing compounds and polymers thereof, and any other compound may be applied within such limits that the objects of the present invention can be achieved.

As the stimuli-responsive dispersants in the present invention, may be desirably used copolymer compounds (hereinafter referred to as "copolymers" merely) containing the stimuli-responsive site and a hydrophobic site. Here, the hydrophobic site takes part in imparting affinity for the dispersant to pigments.

Examples of a compound making up the hydrophobic site include compounds containing a hydrophobic unit such as an isobutyl group, t-butyl group, phenyl group, biphenyl group and naphthyl group as a unit structure, and polymers thereof.

Specific examples thereof include polymers having a hydrophobic monomer such as styrene or t-butyl methacrylate either singly or as a repeating unit. However, the compounds making up the hydrophobic sites of the dispersants according to the present invention are not limited thereto.

As the stimuli-responsive dispersant in the present invention, may be used a copolymer having a plurality of stimuli-responsive sites as components. For example, a photo-responsive site and a temperature-responsive site may be contained in one dispersant, or a pH-responsive site and a temperature-responsive site may be contained in one dispersant.

Fine pigment particles prepared by using such a stimuli-responsive dispersant have such a feature that the dispersion/aggregation behavior thereof can be controlled by combining a plurality of stimuli.

For example, when a copolymer obtained by copolymerizing acrylic acid as a pH-responsive site, N-isopropylacrylamide as a temperature-responsive site and styrene as a hydrophobic site is used as the dispersant, the dispersion/aggregation behavior of the fine pigment particles making up a dispersion system can be controlled by external stimuli. More specifically, they can be controlled in such a manner that they are (a) aggregated at a low pH and a high temperature, (b) dispersed at a high pH and a high temperature or (c) dispersed at a low pH and a low temperature.

The copolymer may be a copolymer having any form of random, block and graft copolymers. It is particularly desirable to use a block copolymer or graft copolymer, since good dispersion stability is easily imparted to the fine pigment particles.

The weight average molecular weight of the polymer compound using as the stimuli-responsive dispersant is 500 or more to 1,000,000 or less, desirably 1,000 or more to 1,000,000 or less.

If the weight average molecular weight exceeds 1,000,000, entanglement within such a polymer compound and between polymer compounds becomes too much. If the weight average molecular weight is lower than 500, the molecular weight may be too low for the polymer compound to exhibit a function as the dispersant, so that such a polymer compound can impart good dispersion stability to the fine pigment particles.

The weight average molecular weight can be measured by a light scattering method, X-ray small angle scattering method, sedimentation equilibrium method, diffusion method or ultracentrifugal method or any of various kinds of chromatography. The weight average molecular weight in the present invention is a weight average molecular weight in terms of polystyrene as measured by GPC (gel permeation chromatography)

The stimuli-responsive dispersants in the present invention may be used either singly or in any combination thereof.

No particular limitation is imposed on the proportion of the stimuli-responsive dispersant used. However, it is 0.05 part by mass or more per 1 part by mass of the pigment.

If the proportion is lower than 0.05 part by mass per 1 part by mass of the pigment, a sufficient dispersing effect may not be achieved in some cases.

The proportion of the stimuli-responsive dispersant used is also 50 parts by mass or less per 100 parts by mass of an aprotic solvent. If the amount of the stimuli-responsive dispersant is more than 50 parts by mass per 100 parts by mass of the aprotic solvent, it may be difficult in some cases to completely dissolve the stimuli-responsive dispersant.

The stimuli-responsive dispersant may also be used in combination with a general dispersant having no stimuli responsiveness within such limits that the objects of the present invention can be achieved.

It is necessary that the stimuli-responsive dispersant according to the present invention is soluble in at least one solvent of the first solvent and the second solvent. If the stimuli-responsive dispersant is insoluble in both first solvent and second solvent, the dispersant cannot be caused to efficiently diffuse into and adsorb on the pigment particles, so that the pigment particles are obtained only as coarse pigment particles.

More specifically, when the stimuli-responsive dispersant is dissolved in the first solvent, the stimuli-responsive dispersant is required to be soluble in at least the first solvent. In this case, the stimuli-responsive dispersant may be insoluble in the second solvent. When the stimuli-responsive dispersant is insoluble in the second solvent, however, the precipitation rate of the stimuli-responsive dispersant on pigment particles to be formed by mixing the first solvent and the second solvent becomes high, which is advantageous to the formation of fine pigment particles, which have high size uniformity and are of the order of nanometer.

When the stimuli-responsive dispersant is dissolved in the second solvent, the stimuli-responsive dispersant has to be soluble in at least the second solvent. In this case, the stimuli-responsive dispersant may be either soluble or insoluble in the first solvent, and any compound may be applied within such limits that the objects of the present invention can be achieved.

(Concentrating Method)

The fine pigment particles in the present invention are also characterized by the concentrating process thereof. More specifically, a process according to the present invention for concentrating a liquid composition comprising a pigment and a dispersant, particles of the pigment being contained in the liquid composition in a dispersed state, includes:

(1) preparing the liquid composition by the production process according to the present invention.

(2) heating the liquid composition to a temperature not lower than the lower critical solution temperature to form an aggregate comprised of the pigment particles and removing a part or all of other components than the pigment particles from the liquid composition.

(3) cooling the liquid composition to a temperature not higher than the lower critical solution temperature to impart dispersibility to the pigment particles making up the aggregate.

The step of concentrating the fine pigment particle will hereinafter be described specifically.

In order to form the aggregate of the fine pigment particles, it is only necessary to apply such an external stimuli that the stimuli-responsive site of the polymer compound used as the dispersant changes from hydrophilicity to hydrophobicity. The fine pigment particles, to which such external stimuli have been applied, are hydrophobic at the surfaces thereof, so that they aggregate in an aqueous solution.

The aggregate of the fine pigment particles can be easily concentrated or isolated by a publicly known method such as spontaneous precipitation, centrifugation or filtration. In this case, the number of times of addition of diluent water or decantation and washing with water is increased, whereby the degree of the concentration can be controlled, and the liquid composition containing the fine pigment particles can be purified.

The thus-obtained aggregate of the fine pigment particles may be used in the form of paste or slurry having a high water content as it is. However, the aggregate may be dried by a conventionally known drying method such as a spray-drying method, centrifuge-drying method, filtration-drying method or freeze-drying method to use them as fine powder.

The external stimuli for aggregating the fine pigment particles vary according to the kind of the stimuli-responsive site contained in the polymer compound used as the stimuli-responsive dispersant. For example, when the polymer compound has a temperature-responsive site, pH-responsive site or photo-responsive site, temperature change, pH change or light irradiation is used as the external stimulus.

When a polymer compound containing a plurality of stimuli-responsive sites is used as the dispersant, external stimuli corresponding to the respective stimuli-respective sites are applied in combination.

In the present invention, a polymer compound containing a temperature-responsive site as the stimuli-responsive site can be desirably used as the stimuli-responsive dispersant. In particular, a compound having a lower critical solution temperature or a polymer thereof is suitable for the temperature-responsive site from the viewpoint of easy handling. However, temperature-responsive sites are not limited thereto within such limits that the objects of the present invention can be achieved.

Fine pigment particles obtained by using, as the dispersant, the polymer compound containing, as the temperature-responsive site, the compound having the lower critical solution temperature or the polymer thereof exhibit good dispersion stability at a temperature not higher than the lower critical solution temperature because their surfaces are hydrophilic, and they aggregate at a temperature not lower than the lower critical solution temperature because their surfaces are hydrophobic.

When a liquid composition containing such fine pigment particle is concentrated, the temperature of the liquid composition is raised to a temperature not lower than the lower critical solution temperature by a conventionally known heating device, thereby forming an aggregate to enable the liquid composition to be simply concentrated.

The step of imparting redispersibility to the aggregate of the fine pigment particles after the concentrating step will be described. In order to impart the redispersibility to the aggregate of the fine pigment particles, it is only necessary to apply such an external stimuli that the stimuli-responsive site of the polymer compound used as the dispersant changes from hydrophobicity to hydrophilicity. The fine pigment particles, to which such external stimuli have been applied, are hydrophilic at the surfaces thereof, so that they disperse in an aqueous solution. A conventionally known stirring, mixing or dispersing device may be used, as needed, when the dispersibility is imparted to the aggregate of the fine pigment particles. Water, an aqueous solution or any other solvent may be added before or after the step of imparting the dispersibility to the aggregates of the fine pigment particles to control the concentration of the fine pigment particles in the liquid composition.

The external stimuli for dispersing the fine pigment particles vary according to the kind of the stimuli-responsive site contained in the polymer compound used as the stimuli-responsive dispersant. For example, when the polymer compound has a temperature-responsive site, pH-responsive site or photo-responsive site, temperature change, pH change or light irradiation is used as the external stimulus.

When a polymer compound containing a plurality of stimuli-responsive sites is used as the dispersant, external stimuli corresponding to the respective stimuli-respective sites are applied in combination.

In the present invention, a polymer compound containing a temperature-responsive site as the stimuli-responsive site can be desirably used as the stimuli-responsive dispersant. In particular, a compound having a lower critical solution temperature or a polymer thereof is suitable for the temperature-responsive site from the viewpoint of easy handling. However, temperature-responsive sites are not limited thereto within such limits that the objects of the present invention can be achieved.

Fine pigment particles using, as a dispersant, a polymer compound containing, as a temperature-responsive site, a compound having a lower critical solution temperature or a polymer thereof aggregate at a temperature not lower than the lower critical solution temperature because their surfaces are hydrophobic, and they exhibit good dispersibility at a temperature not higher than the lower critical solution temperature because their surfaces are hydrophilic.

When dispersibility is imparted to the aggregate of the fine pigment particles, the temperature of the liquid composition may be lowered by a conventionally known cooling device, thereby hydrophilizing the surfaces of the fine pigment particles to simply redisperse the aggregate of the fine pigment particles in cooperation with the steric repulsion effect of the dispersant.

In the concentrating and redispersing steps of the fine pigment particles in the present invention, it is particularly efficient to use, as a stimuli-responsive dispersant, a copolymer compound containing a compound having a lower critical solution temperature or a polymer thereof and a compound having a pH-responsive site or a polymer thereof. Further, the pH-responsive site is desirably a carboxyl-group-containing compound or a polymer thereof. In the fine pigment particles obtained by using such a stimuli-responsive dispersant, the dispersion/aggregation behavior thereof can be controlled by a combination of temperature change and pH change.

Such properties are advantageous to the application of the liquid composition according to the present invention to, for example, an ink composition.

When a polymer compound containing, as a stimuli-responsive site, only a compound having a lower critical solution temperature or a polymer thereof is used as the dispersant, the following inconvenience may occur in some cases. When the liquid composition according to the present invention is ejected by means of, for example, a thermal ink jet system in which heating and bubbling are conducted by a heater, an aggregate of the fine pigment particles is formed by the heating to cause clogging at ejection orifices, so that it is difficult to achieve good ejection stability.

On the other hand, the use of a polymer compound containing, as stimuli-responsive sites, a compound having a lower critical solution temperature or a polymer thereof and a pH-responsive site as the dispersant is convenient. More specifically, the fine pigment particles retain good dispersion stability by electrostatic repulsion force under such pH conditions that the pH-responsive site can be dissociated even at a temperature not lower than the lower critical solution temperature. Therefore, good ejection stability can be retained even in the thermal ink jet system.

(Pigment)

The pigment used in the present invention may be any pigment so far as it is soluble in the first solvent and can achieve the objects of the present invention. The pigment is desirably a stable pigment exhibiting no reactivity under dissolved conditions.

More specifically, pigments used in printing inks and paints may be used. Examples thereof include azo, disazo, condensed azo, anthraquinone, dianthraquinone, anthrapyridine, anthanthrone, thioindigo, naphthol, benzoimidazolone, pyranthrone, phthalocyanine, flavanthrone, quinacridone, dioxazine, diketopyrrolopyrrole, indanthrone, isoindolinone, isoindoline, quinophthalone, perinone and perylene pigments, vat dye pigments, metal complex pigments, basic dye pigments, fluorescent pigments, and daylight fluorescent pigments.

Specific examples thereof include C.I. Pigment Yellow 1, 3, 12, 13, 14, 17, 42, 55, 62, 73, 74, 81, 83, 93, 95, 97, 108, 109, 110, 128, 130, 151, 155, 158, 139, 147, 154, 168, 173, 180, 184, 191 and 199; C.I. Pigment Red 2, 4, 5, 22, 23, 31, 48, 53, 57, 88, 112, 122, 144, 146, 150, 166, 171, 175, 176, 177, 181, 183, 184, 185, 202, 206, 207, 208, 209, 213, 214, 220, 254, 255, 264 and 272; C.I. Pigment Blue 16, 25, 26, 56, 57, 60, 61 and 66; C.I. Pigment Violet 19, 23, 29, 37, 38, 42, 43 and 44; C.I. Pigment Orange 16, 34, 35, 36, 61, 64, 66, 71 and 73; and C.I. Pigment Brown 23 and 38. These pigments may be used either singly or in any combination thereof. Pigment derivatives with a substituent introduced into the basic skeletons of the respective pigments may also be used within such limits that the objects of the present invention can be achieved.

(First Solvent)

The first solvent used in the present invention is desirably an aprotic solvent. In particular, a solvent having a solubility of 5% or more with respect to the second solvent is desirably used, and a solvent freely mixed with the second solvent is more desirably used.

If the pigment is dissolved in a solvent having a solubility lower than 5% for the second solvent, such a solution has a disadvantage in that the pigment-containing particles are hard to precipitate when the solution is mixed with water, and coarse particles are easy to be formed. In addition, it also has a disadvantage in that there is a tendency for the dispersion stability of the resulting fine pigment particles to be adversely affected.

Specific desirable examples of the first solvent include dimethyl sulfoxide, dimethyl-imidazolidinone, sulfolane, N-methylpyrrolidone, dimethylformamide, acetonitrile, acetone, dioxane, tetramethylurea, hexamethylphosphorylamide, hexamethyl-phosphoryltriamide, pyridine, propionitrile, butanone, cyclohexanone, tetrahydrofuran, tetrahydropyrane, ethylene glycol diacetate and γ-butyrolactone. Among these, dimethyl sulfoxide, N-methylpyrrolidone, dimethylformamide, dimethylimidazolidinone, sulfolane, acetone, acetonitrile and tetrahydrofuran are desirable. These solvents may be used either singly or in any combination thereof. No particular limitation is imposed on the proportion of the aprotic solvent used. However, the solvent is used in a range of desirably from 2 parts by mass or more to 500 parts by mass or less, more desirably from 5 parts by mass or more to 100 parts by mass or less, per 1 part by mass of the pigment from the viewpoints of good dissolved state of the pigment, easiness of formation of fine pigment particles having a desired particle size and good color density of the resulting aqueous dispersion.

When it is difficult to dissolve the pigment in only the aprotic solvent, an alkali, which will be described subsequently, may be used to enhance the solubility of the pigment.

(Alkali)

As the alkali used in the present invention, any alkali may be used so far as it can solubilize the pigment in the aprotic solvent and achieve the objects of the present invention. However, hydroxides of alkali metals, alkoxides of alkali metals, hydroxides of alkaline earth metals, alkoxides of alkaline earth metals and organic strong bases are desirable from the viewpoint of the high pigment-solubilizing ability thereof.

Specifically, lithium hydroxide, sodium hydroxide, potassium hydroxide, calcium hydroxide, potassium tert-butoxide, potassium methoxide, potassium ethoxide, sodium methoxide, sodium ethoxide, quaternary ammonium compounds such as tetramethylammonium hydroxide and tetrabutylammonium hydroxide, 1,8-diazabicyclo-[5,4,0]-7-undecene, 1,8-diazabicyclo-[4,3,0]-7-nonene, and guanidine may be used. These alkalis may be used either singly or in any combination thereof.

No particular limitation is imposed on the proportion of the base used. However, it is desirably used in a range of from 0.01 part by mass or more to 1,000 parts by mass or less per 1 part by mass of the pigment. If the proportion of the alkali is lower than 0.01 part by mass per 1 part by mass of the pigment, disadvantage may be involved in some cases in that there is a tendency to become hard to completely dissolve the pigment together with the polymer compound in the aprotic solvent. If the proportion is higher than 1,000 parts by mass on the other hand, disadvantage may be involved in some cases in that the alkali becomes hard to be dissolved in the aprotic solvent, and increase in the solubility of the pigment also becomes unexpectable.

(Additive)

In order to completely dissolve the alkali in the aprotic solvent, some quantity of a solvent having high solubility for the alkali, such as water or a lower alcohol may be added to the aprotic solvent. These solvents act as an alkali-solubilizing aid to increase the solubility of the alkali in the aprotic solvent, and so the dissolution of the pigment becomes easy.

Since disadvantage is involved in that the solubility of the pigment is lowered when the rate of addition is 50% by mass or more based on the quantity of the whole solvent, a rate of addition of about from 0.5 to 30% by mass is generally most effective because the solubility of the alkali in only the aprotic solvent is relatively low. Specifically, water, methanol, ethanol, n-propanol, isopropanol or butyl alcohol may be used.

In order to quickly dissolve the pigment by reducing the amount of the alkali to be used to the minimum in dissolving the pigment, it is desirable to add the alkali in the form of a solution in water or a lower alcohol to the aprotic solvent, in which the pigment has been suspended, until the pigment is dissolved. At this time, removal of foreign matter can be conducted with ease because the pigment is in the form of a solution. In the selection of these alkali-solubilizing aids, it is important to ensure compatibility with the dispersant.

When the pigment is dissolved in the aprotic solvent, at least one of a crystal-growth-preventing agent, an ultraviolet absorbent, an antioxidant and resin additives may be added in addition to the pigment and polymer compound as needed.

Examples of the crystal-growth-preventing agent include phthalocyanine derivatives and quinacridone derivatives well known in this technical field. Specific examples thereof include phthalimidomethyl derivatives of phthalocyanine, sulfonic acid derivatives of phthalocyanine, N-(dialkylamino)methyl derivatives of phthalocyanine, N-(dialkylaminoalkyl)sulfonamide derivatives of phthalocyanine, phthalimidomethyl derivatives of quinacridone, sulfonic acid derivatives of quinacridone, N-(dialkylamino)methyl derivatives of quinacridone and N-(dialkylaminoalkyl)sulfonamide derivatives of quinacridone.

Examples of the ultraviolet absorbent include ultraviolet absorbents such as metal oxides, aminobenzoate ultraviolet absorbents, salicylate ultraviolet absorbents, benzophenone ultraviolet absorbents, benzotriazole ultraviolet absorbents, cinnamate ultraviolet absorbents, nickel chelate ultraviolet absorbents, hindered amine ultraviolet absorbents, urocanic acid ultraviolet absorbents and vitamin ultraviolet absorbents.

Examples of the antioxidant include hindered phenolic compounds, thioalkanic acid esters, organic phosphorus compounds and aromatic amines.

Examples of the resin additives include synthetic resins such as anionically modified polyvinyl alcohol, cationically modified polyvinyl alcohol, polyurethane, carboxymethyl cellulose, polyester, polyallylamine, polyvinyl pyrrolidone, polyethylene imine, polyamine sulfone, polyvinyl amine, hydroxyethyl cellulose, hydroxypropyl cellulose, melamine resins and modified products thereof. All of these crystal growth-preventing agents, ultraviolet absorbents and resin additives may be used either singly or in any combination thereof.

(Second Solvent)

As the second solvent used in the present invention, any solvent may be used so far as it is compatible with the first solvent and can achieve the objects of the present invention. In particular, water or an aqueous solution is desirable.

Additives may be contained in water or the aqueous solution used. As the additives, any additives may be used so far as they are compatible with water or the aqueous solution and can achieve the objects of the present invention. Examples thereof include publicly known pH adjustors including alkalis and pH buffers, and salts. In order to enhance the compatibility of the first solvent with water or the aqueous solution, an organic solvent, for example, an alcohol may also be contained. In this case, the organic solvent contained is not limited to the alcohol, and any organic solvent may be used so far as it can achieve the objects of the present invention.

(Mixing Method)

In order to obtain the fine pigment particles, which have high size uniformity and are of the order of nanometer, mixing of the first solvent with the second solvent is desirably conducted as quickly as possible. Any of the conventionally known devices used in stirring, mixing, dispersion and crystallization, such as an ultrasonic oscillator, a full-zone agitating blade, an internal circulation type stirring device, an external circulation type stirring device, and a flow rate and ion concentration controlling device may be used in the mixing.

The mixing may also be conducted in continuously flowing water. As a method for pouring a pigment solution into water, may be used any of the conventionally known liquid-pouring methods. However, it is desirable that the solution be poured into or fed onto water as an injection flow from a nozzle of a syringe, needle or tube. Incidentally, the solution may also be poured from a plurality of nozzles for the purpose of completing the pouring in a short period of time. In order to enhance the mixing efficiency of the first solvent with the second solvent, the form and size of a mixing container may also be properly designed. For example, the mixing of the first solvent with the second solvent in a micro-space such as a micro-reactor is desirable because the mixing efficiency of the two solvents becomes high, and fine particles are easy to be formed.

No particular limitation is imposed on the temperatures of the first and second solvents when these solvents are mixed. However, the temperature of the solution upon the mixing is desirably within the following range in view of the fact that the temperature of the solution greatly affects the size of the pigment precipitated.

The temperature of the solution is desirably controlled within the range of from −50° C. to 500° C., more desirably from −30° C. to 100° C., still more desirably from −20° C. to 50° C. for the purpose of obtaining fine pigment particles having a particle size of a nanometer order. In order to surely achieve good flowability of the solution at this time, a publicly known freezing point depressant such as ethylene glycol, propylene glycol or glycerol may be added to water to be mixed.

(Ink Composition)

When the liquid composition according to the present invention is used as an ink composition, various additives and aids may be added to the liquid composition as needed. A dispersion stabilizer for stably dispersing a pigment in a solvent is included as one of the additives. Although the fine pigment particles contained in the liquid composition according to the present invention are stably dispersed by the polymer compound making up the fine pigment particles, another dispersion stabilizer may also be added when dispersion is insufficient.

A resin having both hydrophilic part and hydrophobic part or a surfactant may be used as another dispersion stabilizer. Examples of the resin having both hydrophilic part and hydrophobic part include copolymers of a hydrophilic monomer and a hydrophobic monomer.

Examples of the hydrophilic monomer include acrylic acid, methacrylic acid, maleic acid, fumaric acid, monoesters of the carboxylic acids described above, vinylsulfonic acid, styrenesulfonic acid, vinyl alcohol, acrylamide and methacryloxyethyl phosphate.

Examples of the hydrophobic monomer include styrene, styrene derivatives such as α-methylstyrene, vinylcyclohexane, vinylnaphthalene derivatives, acrylic acid esters and methacrylic acid esters.

Any of copolymers of various forms such as random, block and graft copolymers may be used as the copolymer. As a matter of course, both hydrophilic monomer and hydrophobic monomer are not limited to those described above.

An anionic, nonionic, cationic or amphoteric surfactant may be used as the surfactant.

Examples of the anionic surfactant include fatty acid salts, alkyl sulfate salts, alkylarylsulfonic acid salts, alkyl diaryl ether disulfonic acid salts, dialkylsulfosuccinic acid salts, alkylphosphonic acid salts, naphthalenesulfonic acid-formalin condensates, polyoxyethylene alkylphosphate salts and glycerol borate fatty acid esters.

Examples of the nonionic surfactant include polyoxyethylene alkyl ethers, polyoxyethylene-oxypropylene block copolymers, sorbitan fatty acid esters, glycerol fatty acid esters, polyoxyethylene fatty acid esters, polyoxyethylene-alkylamines, fluorine-containing surfactants and silicon-containing surfactants.

Examples of the cationic surfactant include alkylamine salts, quaternary ammonium salts, alkylpyridinium salts and alkylimidazolinium salts.

Examples of the amphoteric surfactant include alkylbetaines, alkylamine oxides and phosphatidyl choline. Incidentally, the surfactants are also not limited to those mentioned above.

Besides, an aqueous solvent may be added to the liquid composition according to the present invention as needed. When the liquid composition is used as an ink-jet ink in particular, the aqueous solvent is used for the purpose of preventing drying at orifices of the ink and solidification of the ink. Aqueous solvents may be used either singly or as a mixture thereof.

As the aqueous solvent, any of the solvents described above may be used. When the liquid composition is used as an ink, the content of the aqueous solvent is within a range of from 0.1 to 60% by mass, desirably from 1 to 40% by mass, based on the whole mass of the ink.

When the liquid composition is used as an ink, examples of other additives include pH adjustors for achieving stabilization of the ink and stability of the ink to piping in a recording apparatus, penetrants for accelerating penetration of the ink into a recording medium to facilitate apparent drying and mildewproofing agents for preventing occurrence of mildew in the ink.

Besides, chelating agents for blocking metal ions in the ink to prevent precipitation of metals at a nozzle portion and precipitation of insoluble matter in the ink and antifoaming agents for preventing occurrence of foams upon circulation, transfer or preparation of a recording liquid may be mentioned. In addition, antioxidants, viscosity modifiers, conductivity-imparting agents and ultraviolet absorbents may also be mentioned.

The ink composition according to the present invention can be prepared by mixing the liquid composition according to the present invention with the above-described components, and uniformly dissolving or dispersing them. When an excess amount of the polymer compound and additives are contained in the ink composition prepared, they may be suitably removed by a publicly known method such as centrifugal separation or dialysis to re-adjust the ink composition.

(Image Forming Process, and Liquid Application Method and Apparatus)

The ink composition according to the present invention can be used in various kinds of image forming methods and apparatus by various printing methods, ink-jet methods or electrophotographic methods, and an image can be formed by an image forming method using such an apparatus. When the liquid composition is used, the liquid composition may be used in a liquid application method for forming a minute pattern by an ink-jet method or for administering a drug.

The image forming process according to the present invention is a process for forming an excellent image with the ink composition according to the present invention. The image forming process according to the present invention is desirably an image forming process including ejecting the ink composition according to the present invention from an ink-ejecting part to apply the composition to a recording medium, thereby conducting recording. A process using an ink-jet method in which thermal energy is applied to an ink to eject the ink is desirably used for forming an image.

In the ink composition according to the present invention, bleeding and/or feathering on a recording medium can be inhibited by using stimuli caused by a polyvalent cation in combination.

The block polymer compound according to the present invention has such a feature that the polymer compound contains a repeating unit having an organic acid including a polycyclic aromatic ring. The organic acid including the polycyclic aromatic ring is easy to cause an interaction with the polyvalent cation due to its strong hydrophobicity. Therefore, when the polyvalent cation is present on a recording medium, the ink composition quickly causes aggregation, whereby an ink composition, a liquid application method and a liquid application apparatus, by which bleeding and/or feathering on a recording medium can be improved, may also be provided.

Desirable Examples of the polyvalent cation include, as metal cations, divalent cations such as Ca, Cu, Mg, Ni, Zn, Fe and Co, and trivalent cations such as Al, Nd, Y, Fe and La. Examples of non-metal cations include a diammonium cation and a triammonium cation.

As a method for applying the polyvalent cation to a recording medium, a recording medium to which the polyvalent cation has been applied in advance may be used, or a method in which the polyvalent cation is shot throughout the whole region forming an image by an ink-jet head may also be used.

As a method for applying the stimuli, may be applied various methods. As a preferred embodiment, a method for applying stimuli in the case where the stimuli are a polyvalent cation will be described. As described in, for example, Japanese Patent Application Laid-Open No. 64-63185, the polyvalent cation may be shot throughout the whole region forming an image by an ink-jet head. It is also desirable that the polyvalent cation has been applied to the recording medium in advance.

As for ink jet printers using the ink-jet ink composition according to the present invention, may be mentioned various ink jet recording apparatus such as a piezo ink jet system using a piezoelectric element and a Bubble-Jet (trademark)

system in which thermal energy is applied to an ink to bubble the ink, thereby conducting recording.

This ink jet recording apparatus is schematically described below with reference to FIGURE. Incidentally, FIGURE shows an example of the construction, which by no means limits the present invention. FIGURE is a block diagram showing the construction of the ink-jet recording apparatus.

FIGURE shows a case in which a head is moved to perform recording on a recording medium. In FIGURE, an X-direction drive motor 56 and a Y-direction drive motor 58, which are to drive a head 70 in the X-Y directions, are connected to a CPU 50, which controls the whole motion of the recording apparatus, via an X-motor drive circuit 52 and a Y-motor drive circuit 54, respectively.

According to instructions from the CPU, the X-direction drive motor 56 and the Y-direction drive motor 58 are driven through the X-motor drive circuit 52 and the Y-motor drive circuit 54, respectively, and the head 70 is then positioned in respect to the recording medium.

As illustrated in FIGURE, to the head 70, a head drive circuit 60 is connected in addition to the X-direction drive motor 56 and the Y-direction drive motor 58. The CPU 50 controls the head drive circuit 60 to drive the head 70, i.e., to eject an ink jet ink.

To the CPU 50, an X-encoder 62 and a Y-encoder 64, which are to detect the positions of the head, are further connected, and positional information as to the head 70 is input thereto. A control program is also input into a program memory 66.

The CPU 50 causes the head 70 to move based on this control program and the positional information sent from the X-encoder 62 and Y-encoder 64, and makes the head 70 disposed at the desired position on the recording medium to eject the ink jet ink. In this way, a desired image can be formed on the recording medium. Also, in the case of an image recording apparatus in which a plurality of ink-jet inks can be loaded, the operation as described above may be repeated given times in respect to the ink-jet inks, whereby the desired image can be formed on the recording medium.

After the ejection of the ink-jet ink, the head 70 may also be optionally moved to a position where a removing unit (not shown) for removing an excess ink adhered to the head 70 is disposed, to clean the head 70 by wiping or the like. As a specific method for such cleaning, a conventional method may be used as it is.

After the image has been formed, the recording medium on which the image has been formed is replaced by a new recording medium by way of a recording medium transporting mechanism not illustrated.

Incidentally, in the present invention, the above embodiment may be modified or transformed as long as such modification or the like does not deviate from the gist of the present invention.

For example, in the foregoing description, an example is shown in which the head 70 is moved in the directions of X-Y axes. This head 70 may instead be so made as to move only the X-axis direction (or the Y-axis direction) and the recording medium may be moved in the Y-axis direction (or the X-axis direction), to form an image while moving these interlockingly.

The present invention brings a superior effect on a head which is equipped with a unit for generating thermal energy (e.g., an electrothermal converter or a laser beam) as an energy utilized for ejecting the ink-jet ink and ejects the ink-jet ink by the action of the thermal energy. Such a system enables achievement of highly minute image formation. The use of the ink-jet ink compositions according to the present invention enables much superior image formation.

The typical construction and principles of the apparatus equipped with the above-described unit for generating thermal energy are desirably those using the fundamental principles disclosed in, for example, U.S. Pat. Nos. 4,723,129 and 4,740,796.

This system is applicable to any of what are called an On-Demand type and a continuous type. In particular, the On-Demand type is effective because at least one driving signal, which corresponds to recording information and gives a rapid temperature rise exceeding nuclear boiling, is applied to an electrothermal converter arranged corresponding to a liquid path, in which a liquid is retained, thereby causing the electrothermal converter to generate thermal energy to cause film boiling on the heat-acting surface of a head, so that a bubble can be formed in the liquid in response to the driving signal in relation of one to one. The liquid is ejected through an ejection opening by the growth-contraction of this bubble to form at least one droplet.

When the driving signal is applied in the form of a pulse, the growth-contraction of the bubble is suitably conducted in a moment, so that the ejection of the liquid excellent in responsiveness in particular can be achieved. It is therefore desirable to use such pulsed signals. As the pulsed driving signal, such signals as described in U.S. Pat. Nos. 4,463,359 and 4,345,262 are suitable. When the conditions described in U.S. Pat. No. 4,313,124 that discloses an invention relating to the rate of temperature rise on the heat-acting surface are adopted, far excellent ejection can be conducted.

As the construction of the head, such combined constructions (linear liquid flow path or perpendicular liquid flow path) of ejection openings, a liquid flow path and electrothermal converters as disclosed in the specifications of the above-described U.S. Patents.

Besides, constructions based on U.S. Pat. Nos. 4,558,333 and 4,459,600 which disclose the construction in which a heat-acting portion is arranged in a curved region may also be included in the present invention.

In addition, constructions based on Japanese Patent Application Laid-Open Nos. S59-123670 and S59-138461 may also be effective for the present invention. In other words, ejection of the ink-jet ink can be efficiently performed with certainty according to the present invention even when the type of the head is any type.

Further, in the image forming apparatus according to the present invention, the present invention can be effectively applied to a full-line type head having a length corresponding to the longest width of recording media. Such a head may be of either such a construction that the length is met by a combination of plural heads or such a construction as to be one head integrally formed.

In addition, the present invention is effective even in a serial type such as a head fixed to an apparatus body and a replaceable chip type head in which electrical connection to an apparatus body and the feed of an ink from the apparatus body become feasible by installing the head in the apparatus body.

Further, the apparatus according to the present invention may additionally have a droplet removing unit. When such a unit is added, a far excellent ejecting effect can be realized.

Besides, addition of preliminary auxiliary units which are provided as the constitution of the apparatus according to the present invention is desirable because the effects of the present invention can be more stabilized. As specific examples thereof, may be mentioned capping units for the head, pressurizing or sucking units and preliminary heating units for conducting heating by using electrothermal converters, other heating elements than these or combinations thereof.

In the present invention, the above-described film boiling system is most effective. The amount of an ink-jet ink ejected from each ejection orifice of the ejection head in the apparatus according to the present invention is desirably within a range of from 0.1 to 100 picoliters.

The ink compositions according to the present invention may also be used in indirect recording apparatus using a recording system in which an ink is applied to an intermediate transfer member, and the applied ink is then transferred to a recording medium such as paper. Further, the ink compositions may also be applied to apparatus making good use of an intermediate transfer member by a direct recording system.

EXAMPLES

The present invention will hereinafter be described in detail by the following Examples. However, the present invention is not limited to these examples.

Example 1

<Preparation of Liquid Composition Containing Fine Pigment Particles>

A polymer compound of poly(styrene-b-N-isopropylacrylamide) (product of Sowa Kagaku K.K.) was used as a stimuli-responsive dispersant. This polymer compound is a block copolymer comprised of polystyrene as a hydrophobic site and poly(N-isopropylacrylamide) as a temperature-responsive site having a lower critical solution temperature of 32° C.

The weight average molecular weight Mw of the polymer compound was measured by gel permeation chromatography (GPC) using tetrahydrofuran as a mobile phase. As a result, it was confirmed that the molecular weight was 24,000 in terms of polystyrene and its polydispersity (Mw/Mn) was 1.1.

Fifteen parts by mass of poly(styrene-b-N-isopropylacrylamide) was dissolved in 100 parts by mass of tetrahydrofuran, and 5 parts by mass of copper tetra-tert-butylphthalocyanine was dissolved in the resultant solution while stirring for 2 hours in a container.

This pigment solution was quickly poured by means of a syringe into distilled water being stirred by means of a stirrer while conducting an ultrasonic treatment, thereby precipitating copper tetra-tert-butylphthalocyanine. All the experimental operations described above were performed at 25° C.

The average particle size of the resultant pigment dispersion was measured at 25° C. by means of DLS-7000 (manufactured by Otsuka Electronics Co., Ltd.) As a result, the average particle size was found to be 29.7 nm.

<Concentration of Liquid Composition>

A liquid composition containing the pigment dispersion thus obtained was heated by means of a thermostat to 40° C. that was a temperature not lower than the lower critical solution temperature of the poly(N-isopropylacrylamide) site, thereby aggregating and precipitating the pigment dispersion.

After a supernatant was removed by decantation as much as possible, distilled water was added in such a manner that the concentration by mass of the pigment contained in the final liquid composition was 10% by mass.

The liquid composition after the adjustment of the concentration was completed was cooled to 25° C. under stirring by means of a thermostat, thereby redispersing the aggregates of the fine pigment particles.

The average particle size of the pigment dispersion after the concentration was measured at 25° C. by means of DLS-7000 (manufactured by Otsuka Electronics Co., Ltd.). As a result, the average particle size was found to be 29.5 nm.

Example 2

<Preparation of Liquid Composition Containing Fine Pigment Particles>

The same polymer compound as in EXAMPLE 1 was used as a dispersant.

Twenty parts by mass of poly(styrene-b-N-isopropylacrylamide) was dissolved in 100 parts by mass of tetrahydrofuran, and 5 parts by mass of a C.I. Pigment Red 122 magenta pigment was suspended in the resultant solution while stirring for 2 hours in a container.

An aqueous solution of potassium hydroxide was then added dropwise little by little to dissolve the magenta pigment. This pigment solution was quickly poured by means of a syringe into distilled water stirred by means of a stirrer while conducting an ultrasonic treatment, thereby precipitating the magenta pigment.

All the experimental operations described above were performed at 25° C. The average particle size of the resultant pigment dispersion was measured by means of DLS-7000 (manufactured by Otsuka Electronics Co., Ltd.). As a result, the average particle size was found to be 27.2 nm.

<Concentration of Liquid Composition>

A liquid composition containing the pigment dispersion thus obtained was heated by means of a thermostat to 40° C. that was a temperature not lower than the lower critical solution temperature of the poly(N-isopropylacrylamide) site, thereby aggregating and precipitating the pigment dispersion.

After a supernatant was removed by decantation as much as possible, distilled water was added in such a manner that the concentration by mass of the pigment contained in the final liquid composition was 10% by mass.

The liquid composition after the adjustment of the concentration was completed was cooled to 25° C. under stirring by means of the thermostat, thereby redispersing the aggregates of the fine pigment particles.

The average particle size of the pigment dispersion after the concentration was measured at 25° C. by means of DLS-7000 (manufactured by Otsuka Electronics Co., Ltd.). As a result, the average particle size was found to be 27.5 nm.

Example 3

<Synthesis of Dispersant>

A Schlenk's tube for reaction was charged with N-isopropylacrylamide, tert-butylacrylamide, CuBr, ethyl 2-bromoacrylate, 2,2'-dipyridyl and dimethylformamide to prepare a reaction solution.

After oxygen in the Schlenk's tube was removed by freeze vacuum deaeration, atom transfer radical polymerization (ATRP) was caused to progress at 70° C., thereby synthesizing poly(N-isopropylacrylamide-r-butyl acrylate).

The Schlenk's tube was then charged with poly(N-isopropylacrylamide-r-butyl acrylate), styrene, CuBr, 2,2'-dipyridyl and dimethylformamide to prepare a reaction solution.

After oxygen in the Schlenk's tube was removed by freeze vacuum deaeration, atom transfer radical polymerization (ATRP) was caused to progress at 100° C., thereby synthesizing poly[(N-isopropylacrylamide-r-tert-butyl acrylate)-b-styrene].

The weight average molecular weight Mw of this polymer compound was measured by gel permeation chromatography (GPC) using tetrahydrofuran as a mobile phase. As a result, it was confirmed that the molecular weight was 19,000 in terms of polystyrene and its polydispersity (Mw/Mn) was 1.37.

NMR measurement revealed that the copolymerization compositional ratio (in terms of a molar ratio) among N-isopropylacrylamide, tert-butyl acrylate and styrene was about 7:1:10.

Poly[(N-isopropylacrylamide-r-tert-butyl acrylate)-b-styrene] was dissolved in dichloromethane, and trifluoroacetic acid was added to stir the resultant mixture for 15 hours, thereby hydrolyzing poly[(N-isopropylacrylamide-r-tert-butyl acrylate)-b-styrene] to prepare poly[(N-isopropylacrylamide-r-acrylic acid)-b-styrene]. It was confirmed that the rate of hydrolysis was almost 100%. This polymer compound is a block copolymer containing poly(N-isopropylacrylamide) as a temperature-responsive site having a lower critical solution temperature, polyacrylic acid as a pH-responsive site and polystyrene as a hydrophobic site.

<Preparation of Liquid Composition Containing Fine Pigment Particles>

Twenty parts by mass of poly[(N-isopropylacrylamide-r-acrylic acid)-b-styrene] was dissolved in 100 parts by mass of tetrahydrofuran, and 5 parts by mass of a C.I. Pigment Yellow 128 azo pigment was suspended in the resultant solution while stirring for 2 hours in a container.

An aqueous solution of potassium hydroxide was then added dropwise little by little to dissolve the azo pigment. This pigment solution was quickly poured by means of a syringe into distilled water stirred by means of a stirrer while conducting an ultrasonic treatment, thereby precipitating the azo pigment.

All the experimental operations described above were performed at 25° C. The average particle size of the resultant pigment dispersion was measured by means of DLS-7000 (manufactured by Otsuka Electronics Co., Ltd.). As a result, the average particle size was found to be 25.6 nm.

<Concentration of Liquid Composition>

A liquid composition containing the pigment dispersion thus obtained was heated by means of a thermostat to 40° C. that was a temperature not lower than the lower critical solution temperature of the poly(N-isopropylacrylamide) site, and the pH of the liquid composition was adjusted to 3 with 1.0N hydrochloric acid, thereby aggregating and precipitating the pigment dispersion.

After a supernatant was removed by decantation as much as possible, distilled water and a 1.0N aqueous solution of potassium hydroxide were added in such a manner that the concentration by mass of the pigment contained in the final liquid composition was 10% by mass, and the pH of the liquid composition was 8.

The liquid composition after the adjustment of the concentration was completed was cooled to 25° C. under stirring by means of a thermostat, thereby redispersing the aggregates of the fine pigment particles.

The average particle size of the pigment dispersion after the concentration was measured at 25° C. by means of DLS-7000 (manufactured by Otsuka Electronics Co., Ltd.). As a result, the average particle size was found to be 25.7 nm.

<Preparation of Ink Composition>

Fifty parts by mass of the liquid composition (pigment concentration: 10% by mass) containing the azo pigment dispersion prepared in EXAMPLE 3, 7.5 parts by mass of diethylene glycol, 5 parts by mass of glycerol, 5 parts by mass of trimethylolpropane, 0.2 part by mass of Acetylenol EH and 32.3 parts by mass of ion-exchanged water were mixed to prepare an ink composition.

<Evaluation as to Printing>

The ink composition prepared was charged into an ink jet printer BJF 800 (trade name, manufactured by Canon Inc.) to conduct ink jet recording of a solid-printed image on plain paper. The resultant recorded article was visually evaluated. As a result, it was confirmed that the article had a bright hue.

The ink composition prepared was charged into the ink jet printer BJF 800 (trade name, manufactured by Canon Inc.) to conduct ink jet recording of a character image on plain paper, thereby evaluating the ink composition as to ejection stability.

The ejection stability was evaluated by continuously printing 1,000,000 English characters and numerals and visually observing the resultant print. As a result, beautiful printing could be conducted without causing problems of blurring and ejection failure to the end.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-161522, filed Jun. 9, 2006, which is hereby incorporated by reference herein in its entirety.

What is claimed is:

1. A process for producing a concentrated liquid composition comprising a pigment and a stimuli-responsive dispersant, wherein the pigment having particle size of 100 nm or less is contained in the concentrated liquid composition in a dispersed state, the process comprising:
   (1) obtaining a solution by dissolving the pigment in a first solvent;
   (2) mixing the solution with a second solvent to obtain a resulting liquid composition, wherein the stimuli-responsive dispersant is contained in at least one of the first or second solvents and wherein the stimuli-responsive dispersant is a copolymer comprising: (a) a site having a lower critical solution temperature in water or an aqueous solution; and (b) a hydrophobic site, wherein the (a) site is poly(N-isopropylacrylamide) and the (b) site is polystyrene;
   (3) heating the resulting liquid composition obtained in (2) to a temperature not lower than a first temperature to form an aggregate comprised of pigment particles, wherein the first temperature is the lower critical solution temperature;
   (4) removing other components except the pigment particles from the resulting liquid composition; and
   (5) cooling the resulting liquid composition to a temperature not higher than the first temperature to set the pigment particles making up the aggregate comprised of the pigment particles into a dispersed state.

2. The production process according to claim 1, wherein the first solvent is an aprotic solvent.

3. The production process according to claim 1, wherein the first solvent is a mixed solvent of an aprotic solvent and an alkali.

4. The production process according to claim 1, wherein the second solvent is water or an aqueous solution.

5. The production process according to claim 1, wherein the stimuli-responsive dispersant further comprises a site that reversibly changes hydrophilicity and hydrophobicity with respect to an external stimulus.

6. The production process according to claim 1, wherein the stimuli-responsive dispersant further comprises (c) an anionic site.

7. The production process according to claim 1, wherein the stimuli-responsive dispersant is a block copolymer.

8. The production process according to claim 1, wherein the stimuli-responsive dispersant has a weight average molecular weight of 500 to 1,000,000.

9. A liquid composition containing a pigment in a dispersed state produced by the process according to claim 1.

10. An ink jet recording ink composition comprising the liquid composition produced by the process according to claim 1.

11. An image forming apparatus comprising a unit for applying the ink composition according to claim 10 to a medium, thereby recording an image.

12. An image forming process comprising applying the ink composition according to claim 10 to a medium, thereby recording an image.

* * * * *